US012694220B2

(12) United States Patent　　　(10) Patent No.:　US 12,694,220 B2
Galli　　　　　　　　　　　　　　　(45) Date of Patent:　Jul. 28, 2026

(54) METHOD AND SYSTEM FOR PERSONALIZED EMBEDDING SEARCH ENGINE

(71) Applicant: Klaviyo, Inc., Boston, MA (US)

(72) Inventor: Michael Galli, Boston, MA (US)

(73) Assignee: Klaviyo, Inc., Boston, MA (US)

( * ) Notice: Subject to any disclaimer, the term of this patent is extended or adjusted under 35 U.S.C. 154(b) by 516 days.

(21) Appl. No.: 18/114,888

(22) Filed: Feb. 27, 2023

(65) Prior Publication Data

US 2024/0289554 A1　　Aug. 29, 2024

(51) Int. Cl.
| | |
|---|---|
| *G06F 40/253* | (2020.01) |
| *G06F 16/9535* | (2019.01) |
| *G06F 16/954* | (2019.01) |
| *G06F 40/30* | (2020.01) |

(52) U.S. Cl.
CPC .......... *G06F 40/30* (2020.01); *G06F 16/9535* (2019.01); *G06F 16/954* (2019.01)

(58) Field of Classification Search
None
See application file for complete search history.

(56) References Cited

U.S. PATENT DOCUMENTS

| | | | | |
|---|---|---|---|---|
| 11,093,951 | B1 | 8/2021 | Podgorny et al. | |
| 11,409,752 | B1 * | 8/2022 | Qadrud-Din | ...... G06F 16/24578 |
| 11,429,257 | B1 | 8/2022 | Nandagopal | |
| 11,823,074 | B2 | 11/2023 | Doebelin et al. | |

| | | | | |
|---|---|---|---|---|
| 11,909,699 | B1 * | 2/2024 | Natoli | ................ G06Q 30/0201 |
| 12,353,469 | B1 | 7/2025 | Mahabadi et al. | |
| 2015/0058315 | A1 * | 2/2015 | Heidasch | ............... G06N 20/00 |
| | | | | 707/711 |
| 2018/0052928 | A1 * | 2/2018 | Liu | ....................... G06F 16/243 |
| 2018/0150551 | A1 | 5/2018 | Wang et al. | |
| 2020/0110768 | A1 * | 4/2020 | Bender | .............. G06Q 30/0601 |
| 2022/0254338 | A1 * | 8/2022 | Gruber | .................... G06F 3/167 |

(Continued)

FOREIGN PATENT DOCUMENTS

| | | |
|---|---|---|
| CN | 113934837 A | 1/2022 |
| CN | 117349429 A | 1/2024 |
| WO | 2024205602 A1 | 10/2024 |

OTHER PUBLICATIONS

Using Word Embedding to Enable Semantic Queries in Relational Databases (Year: 2017).

*Primary Examiner* — Seong-Ah A Shin
(74) *Attorney, Agent, or Firm* — Batt IP A Law Corporation; Richard Batt

(57)　　　　　ABSTRACT

Methods and systems for optimized large-scale semantic search and information retrieval are disclosed. Via comparing similarity scores between the search query and the resources, the personalized embedding-based search engine and system can select probable answers with the consideration of the query's intent and context. The resources can comprise all relevant content or customized content related to the searched site or domain. The system can apply custom score adjustments to the similarity scores. In addition, the system can partition and process a resource in a number of different manners to generate different resource vectors. Further, the search query can be an explicit query or an implied query that is inferred from the user's actions.

19 Claims, 10 Drawing Sheets

100

(56) References Cited

U.S. PATENT DOCUMENTS

| 2023/0245171 A1* | 8/2023 | Niu | G06Q 30/0256 |
| | | | 705/14.55 |
| 2023/0306284 A1* | 9/2023 | Tappin | G06F 16/248 |
| 2023/0376284 A1* | 11/2023 | Shi | G06F 8/10 |
| 2024/0054539 A1* | 2/2024 | Ekfeldt | G06F 40/253 |
| 2024/0232261 A9 | 7/2024 | Gunasekara et al. | |
| 2024/0289554 A1 | 8/2024 | Galli | |
| 2024/0419710 A1* | 12/2024 | Matson | G06N 3/08 |
| 2025/0117414 A1 | 4/2025 | McCurdy et al. | |
| 2025/0117421 A1 | 4/2025 | McCurdy et al. | |
| 2025/0181899 A1 | 6/2025 | Ajmera et al. | |
| 2026/0057004 A1 | 2/2026 | Sheikholeslami | |
| 2026/0087244 A1 | 3/2026 | Jones et al. | |

* cited by examiner

Query 101
- Support Tickets 104
- Chats 106

Implied Query 103
- User Actions 108 → Textual Query 109

Resources 109
- Help Articles 110
- Community Posts 112
- Blogs 114
- Developer Portal 116
- Academy 118

Partitioning 119

Embedding 102

Vectorized Query 120

Vectorized Resources 123

Similarity Scores 122

Custom Score Adjustments 124

Ordered Resources 126

User Responses 128

Model Reinforcement 130

100

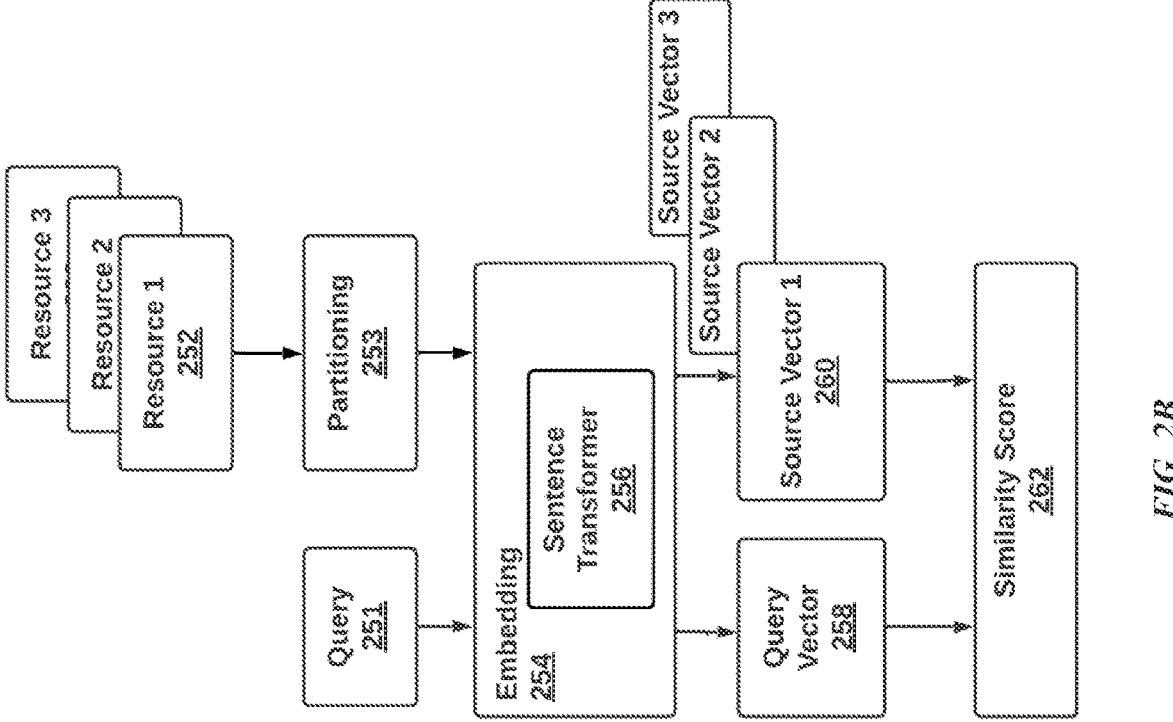
*FIG. 2B*

User entered Template Editor 364; user dragged Template 358 to Editor Canvas 365; User created Email 362

Implied Queries: 370
How to edit an email?
How to save an email?
How to generate a universal block?

350

352

351    How to edit an email

Help Center 370

374    ▪ How to change your email settings
       ▪ How to create flow email content
       ▪ How to save an email template
       ▪ How to generate a universal block Community 372

✓ Unable to edit an email

362

365

360

358

364

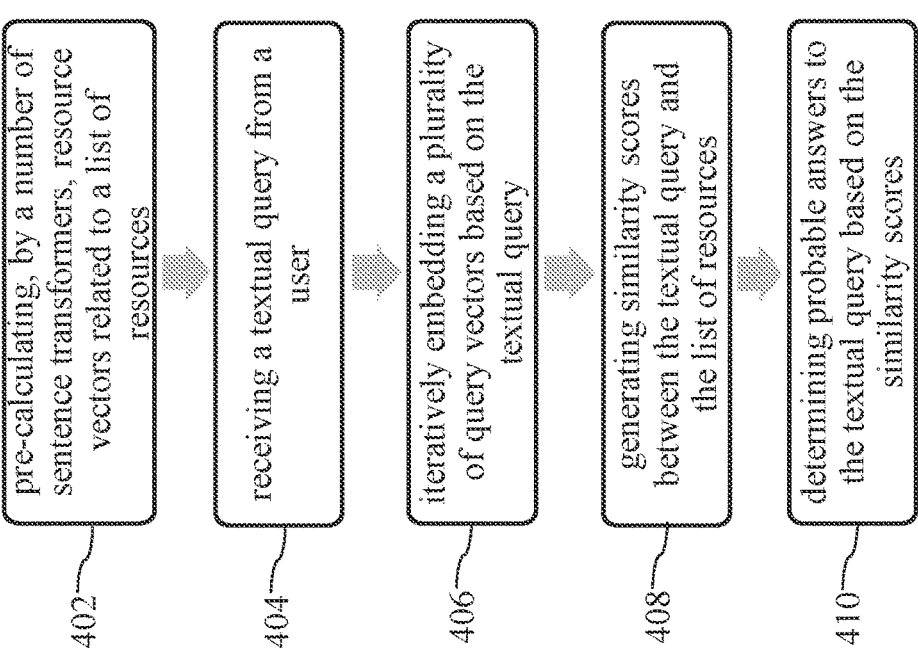

402 pre-calculating, by a number of sentence transformers, resource vectors related to a list of resources 404 receiving a textual query from a user 406 iteratively embedding a plurality of query vectors based on the textual query 408 generating similarity scores between the textual query and the list of resources 410 determining probable answers to the textual query based on the similarity scores pre-calculating, by a sentence transformer, resource vectors related to a list of resources — 502 receiving a query from a user — 504 embedding a query vector based on the query — 506 generating similarity scores between the query and the list of resources — 508 determining probable answers to the query based on the similarity scores — 510

500

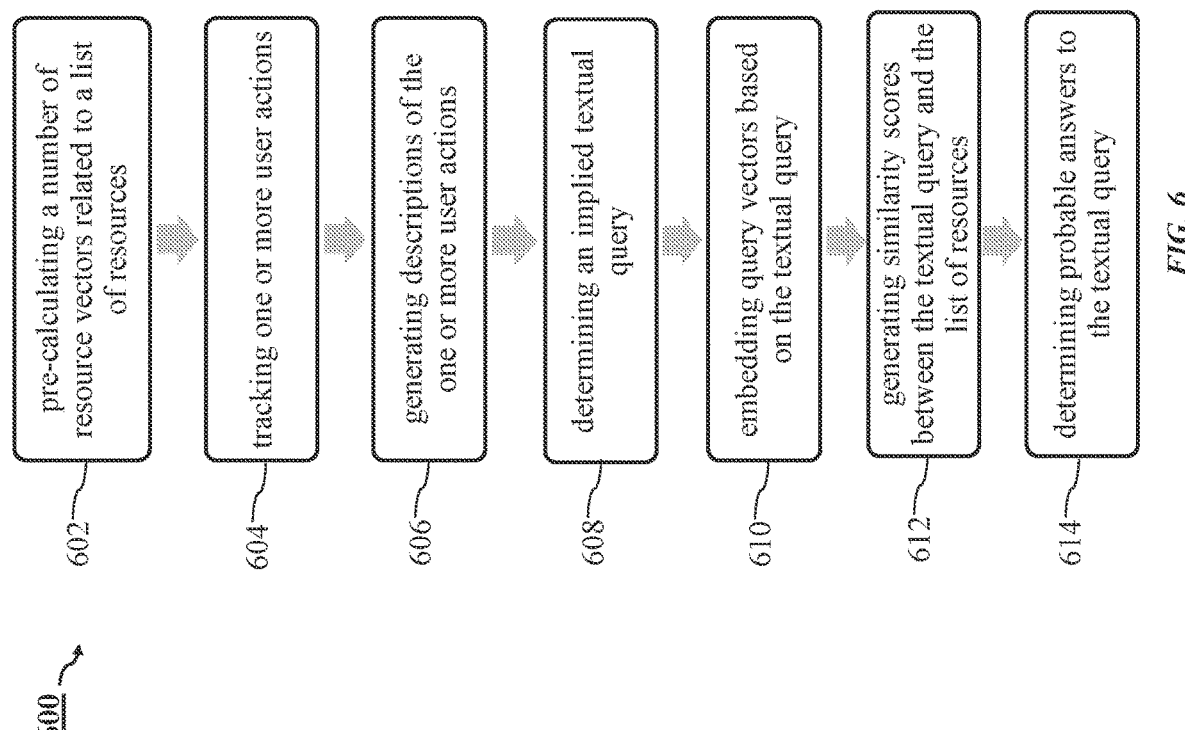

pre-calculating a number of resource vectors related to a list of resources

602 tracking one or more user actions

604 generating descriptions of the one or more user actions

606 determining an implied textual query

608 embedding query vectors based on the textual query

610 generating similarity scores between the textual query and the list of resources

612 determining probable answers to the textual query

METHOD AND SYSTEM FOR PERSONALIZED EMBEDDING SEARCH ENGINE

TECHNICAL FIELD

The present subject matter relates to systems and methods for improved large-scale semantic search and information retrieval. More specifically, the present subject matter relates to a personalized embedding search engine and system.

BACKGROUND

A web search engine is a powerful tool to enable a user to find answers from the internet. A search engine can respond to a user's textual web search query by providing a list of results. When a user enters a query into a search engine, the engine searches for relevant results within its indexed resources. The results can be ranked by relevancy and displayed to the user.

Site search is limited to a specific website or domain. For example, a site search can handle questions from a public or private website user, and return answers indexed within or related to a website. In addition, a site search engine can be customized to better suit a business's needs. Furthermore, the site search engine function can be adopted in other areas, such as ticketing support.

Traditional web or site search engine, at a base level, searches for content containing the same or similar keywords as the search query. Sometimes, it has difficulty in accurately understanding the semantic meaning of a search query to return relevant answers. As such, there are areas for improving a search engine in handling search queries.

SUMMARY OF THE INVENTION

The present subject matter describes improved methods for improved large-scale semantic search and information retrieval via a personalized embedding-based search engine and system. In order to provide a relevant response to a search query, the system can compare the semantic similarities between the content with the consideration of the intent and context of the query. The resources available for the query can comprise all relevant content or customized content related to the searched site or domain, such as help center articles, community discussions, academy content, and blog posts. The system can compare similarity scores between the query and the resources, and then select one or more probable answers to the query based on the similarity scores. Because the personalized embedding-based search system can capture the semantic meaning of texts, it can render search results to a query better than traditional methods, such as a key word search.

According to some embodiments, the query can be an explicit query or an implied query. The explicit query can be a typed question or a voice-input query from a user. The explicit query can also be a question from a support ticket or in a chat with an agent. By contrast, the system can track a user's actions, omission of actions, or input on a domain, transcribe these tracked actions into descriptions, and generate an implied query based on the user's inferred intent. Furthermore, the tracked user's actions or input can assist in properly interpreting the user's explicit query.

According to some embodiments, to address the intent and context of the query, the system can apply one or more custom score adjustments to the generated similarity scores. Such custom score adjustments can be based on, for example, the user's experience level, the user's real-time position in the site or domain, or the user's previous question. Furthermore, the custom score adjustments can be based on attributes of the query and/or the resources. For example, the context of the query, the length of the query, or the keyword of the query, can also be considered.

Furthermore, prior to search time, the system can partition and process one resource in a number of different ways, each of which can generate an individual resource vector. For example, a different sentence transformer can partition one resource article in a different way. As such, each source can be associated with a number of resource vectors that can be used to generate a representative resource vector, such as a mean resource vector.

A computer implementation of the present subject matter comprises: pre-calculating, by each of a plurality of sentence transformers, a plurality of resource vectors related to a list of resources, receiving, at a server, a textual query from a user, iteratively embedding, by each of the plurality of sentence transformers, a plurality of query vectors based on the textual query, generating similarity scores between the textual query and the list of resources, and determining, from the list of resources, one or more probable answers to the textual query based on the similarity scores. The probable answers and the textual query can have similarity scores higher than a predetermined threshold. Furthermore, the probable answers can comprise identified portions of the list of resources.

Furthermore, the method can further comprise: partitioning each resource in the list of resources in a number of ways, wherein each resource is embedded differently in the pre-calculating. The method can further comprise saving the plurality of resource vectors in a source vector database.

According to some embodiments, the method can further comprise tracking one or more user actions, generating descriptions of the user actions, and determining the textual query based on the descriptions, wherein the textual query is an implied textual query.

According to some embodiments, the method can further comprise applying one or more custom score adjustments to the similarity scores based on the query's intent and context. The custom score adjustments can be based on user-specific factors such as the user's experience level, the user's real-time position on the site, or the user's previous question(s). Furthermore, the custom score adjustments can be based on query/resource attributes such as the context of the query, the length of the query, and the keyword of the query.

According to some embodiments, the method can further comprise generating a mean query vector of the textual query based on the plurality of query vectors, and generating a mean resource vector of the list of resources based on the plurality of resource vectors, wherein the similarity scores are based on the mean query vector of the textual query and the mean resource vector of the resources.

According to some embodiments, the method can further comprise sorting and ranking the probable answers to the textual query based on the similarity scores in descending order.

Another computer implementation of the present subject matter comprises: pre-calculating, by a sentence transformer, a plurality of resource vectors related to a list of resources, receiving, at a server, a query from a user, embedding, by the sentence transformer, a query vector based on the query, generating similarity scores between the query and the list of resources, and determining, from the list of resources, one or more probable answers to the query based on the similarity scores. The query can be a textual query either explicitly entered or implied by the user's actions.

Yet another computer implementation of the present subject matter comprises: pre-calculating, by each of a plurality of sentence transformers, a plurality of resource vectors related to a list of resources, tracking one or more user actions, generating descriptions of the one or more user actions, determining an implied textual query based on the one or more descriptions, iteratively embedding, by each of the plurality of sentence transformers, a plurality of query vectors based on the textual query, generating similarity scores between the textual query and the list of resources, and determining, from the list of resources, one or more probable answers to the textual query based on the similarity scores.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 2B shows yet another exemplary diagram of a search engine, according to one or more embodiments of the present subject matter;

FIG. 4 shows some exemplary processes for answering a query, according to one or more embodiments of the present subject matter;

FIG. 6 shows some exemplary processes for answering a query, according to one or more embodiments of the present subject matter;

DETAILED DESCRIPTION

The present subject matter pertains to improved approaches for an embedding-based search engine system.

Embodiments of the present subject matter are discussed below with reference to FIGS. 1-8.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for efficiently selecting query answers from a large number of available resources. These can be implemented with computers that execute software instructions stored on non-transitory computer-readable media. An improved campaign message system can have one or more of the features described below.

Figure 1:
FIG. 1 shows an exemplary diagram of a personalized embedding all-content search engine, according to one or more embodiments of the present subject matter.

FIG. 1 shows an exemplary diagram of a personalized embedding all-content search engine system 100 according to the present subject matter. Upon receiving a vectorized user query, the system can retrieve the pre-calculated vectorized resources 123 and compare them to the newly vectorized user query for semantic textual similarity (SMS), and select one or more answers that are semantically similar or related to the user query.

A site or domain can include or be associated with resources 109 that could be provided as an answer to a user's question or query. According to some embodiments, an answer to a query can be a specific paragraph of a resource. The resources 109 can include all available content, for example, pre-written help articles 110, community posts 112, blogs 114, developer portal 116 and academy 118. Furthermore, each source can comprise one or more textual paragraphs or sections.

As shown in FIG. 1, via embedding 102, the search engine system 100 can pre-calculate vectorized resources 123 based on resources 109. Via one or more language models, embedding 102 can compress textual data into lower dimensional representations, e.g., vectors. In addition, examples of such language models can be sentence transformers such as Sentence-BERT (SBERT) that are configured to create sentence-level or paragraph-level vector embeddings. The resulting embeddings can be high dimensional and dense.

Furthermore, by utilizing sentence-level embedding or paragraph-level embeddings, the system can generate sentence vectors to represent a resource. The sentences and texts can be mapped or encoded so that content with similar meanings is close in vector space. As such, numerically similar embeddings are also semantically similar.

According to some embodiments, the embedding 102 can adopt several different sentence transformers, each of which can partition a resource, e.g., a help article, in a different matter. For example, a sentence-transformer model can vectorize all texts in an article, whereas another can only process the first sentence of each paragraph.

According to some embodiments, for a same sentence transformer, a resource can be partitioned in a number of different ways, wherein each partitioning and embedding will yield a different resource vector. For example, a first partitioning can embed an abstract of the help article instead of the whole article, and a second partitioning can embed the first sentence of each paragraph. In addition, an article can be divided and organized as a list of article content. For example, an article can be partitioned into an article title, a number of section headers, and a list of section content. Furthermore, the system can remove generic headers in the section headers, and divide large sections in the section content. According to some embodiments, the system can save the pre-calculated vectorized resources 123 in a database.

At search time, a user can provide a query 101 on a computing device associated with search engine system 100, the system can vectorize the query via the embedding 102. According to some embodiments, query 101 can be an explicit query from support tickets 104 or chats 106. Furthermore, query 101 can be a textual query that can be directly provided to embedding 102 for vectorization. Query 101 can also be a question transcribed from voice inputs via a voice-enabled interface.

According to some embodiments, the system can generate an implied query 103 from the user's tracked actions on a site or domain. A number of tracking and analytics tools can be adopted. For example, an application such as Google Analytics can record the user's click history by capturing elements that the user has clicked. In addition, an application can also record the user's scrolling history by tracking where the user has scrolled. Similarly, the application can capture the user's viewing section recordings.

Next, the system can generate descriptions based on the tracked user actions. For example, the descriptions can be "the user clicked a template email", "the user dragged the clicked template email to an email editor," and "the user spend over three minutes editing the template email." Furthermore, such descriptions can be used by the system to infer a textual query that is implied by these user actions. For example, an implied query base on the aforementioned descriptions can be "how to edit an email," or "how to save an email."

According to some embodiments, via the tracked user actions, the system can understand the meaning and context of the search query, which can be either explicit or implied. According to some embodiments, the system can apply custom score adjustments to the similarity scores, wherein the custom score adjustments can be based on user-specific factors such as the user's tracked location on a website.

Upon receiving query 101 or implied query 103, the system can vectorize it via embedding 102 to generate vectorized query 120. According to some embodiments, embedding 102 can adopt a number of different sentence transformers, each of which can partition a query in a different matter. According to some embodiments, for one sentence transformer, the query can be partitioned in a number of different ways, wherein each partitioning and embedding will yield a different query vector.

To find semantically similar sentences in a resource as a response to the query, the system can locate paired embeddings that are numerically similar in the vector space. A number of similarity operations can be adopted by the system, such as scalar product comparison. For example, the system can determine the cosine similarity between the vectorized query 120 and each vectorized resource 123.

To compare the semantic similarities between the content, the system can generate similarity scores 122 between the vectorized query 120 and vectorized resources 123. Similarity scores can measure the cosine similarity of the vectorized content. They can range between −1 and 1. Furthermore, a higher number of similarity score means more similarity between the query and the resource, thus rendering it a likely answer.

According to some embodiments, when there are multiple vectorized resources based on one resource, for example, from different sentence transformers, the system can generate a mean resource vector. In addition, the same resource can lead to a different mean resource vector when being partitioned differently. According to some embodiments, the system can pre-calculate the mean resource vectors and save them in the database for later retrieval. At search time, the system can also generate a mean query vector based on a number of query vectors generated by different sentence transformers.

By comparing the similarity scores 122 between the vectorized content, the system can select a number of vectorized resources that are numerically similar and thus semantically similar. For example, the system can select vectorized pairs with similarity scores higher than a threshold value. According to some embodiments, the threshold value can be empirically predetermined or dynamically adapted. Furthermore, the system can sort and rank the selected resources in descending order to generate ordered resources 126, which can be displayed to the user as likely answers to his/her query.

According to some embodiments, the system can apply one or more custom score adjustments 124 to the similarity scores. For example, the customer score adjustments can be based on a number of user-specific factors, such as the user's experience level, the user's real-time position on the website, or the user's previous question record. According to some embodiments, the system can apply a numeric scalar to the similarity scores, for example, if the user's experience level is low, then increase the similarity scores for resources in the "Getting Started" section. According to some embodiments, the experience level can be measured by the known time, e.g., 2 days, since the user's registration with the site or domain. In another example, the experience level can be estimated by the number of campaigns the user has created and executed. Furthermore, the experience level can be reflected by the administrative power or the number of accounts associated with the user.

According to some embodiments, the custom score adjustments can be based on a number of attributes of the query and/or the resources. Such attributes can enhance the understanding of the content and context of the query. For example, one attribute can describe the user's tracked location when he/she submits the supporting ticket or where the implied query is inferred from. For example, the system can increase the similarity scores for resources in the "flow" section when the user is creating a flow in an email campaign.

According to some embodiments, one attribute can be the keyword(s) in the content or titles. When there are identical keywords or synonyms of a keyword, the system can increase or decrease the similarity scores between these vectorized texts. For example, when a query has a unique keyword, such as "Shopify", the system can increase similarity scores for resources whose title includes the unique keyword. On the contrary, when a query has a unique keyword, e.g., "Shopify", the system can decrease similarity scores for resources without the keyword in their titles.

According to some embodiments, one attribute can be the textual length of the query. For example, when a query is very short, e.g., less than 2 words, the system can increase the similarity scores for resources in the "Getting Started" section. According to some embodiments, the system can apply custom score adjustments 124 based on weighted considerations of user-specific factors and various attributes.

According to some embodiments, the system can automatically apply custom score adjustments to prioritized partitioned content. For example, the system can multiply scores of article titles by 1.2 and multiply scores of section headers by 1.1.

According to some embodiments, after displaying the probable answers and receiving the user's input, the system can apply model reinforcement 130 by learning from user responses 128. For example, a successfully closed supporting ticket can confirm the accuracy of a probable answer, thus increasing the likelihood of success for the same answer in response to a similar question. As such, the system can increase the similarity scores between the same or similar query and the confirmed answer. As an alternative, the system can apply minimum similarity scores for a confirmed Query/Answer pair. In addition, model reinforcement 130 can be applied to other stages, such as similarity scores 122 or vectorized resources 123.

Figure 2A:
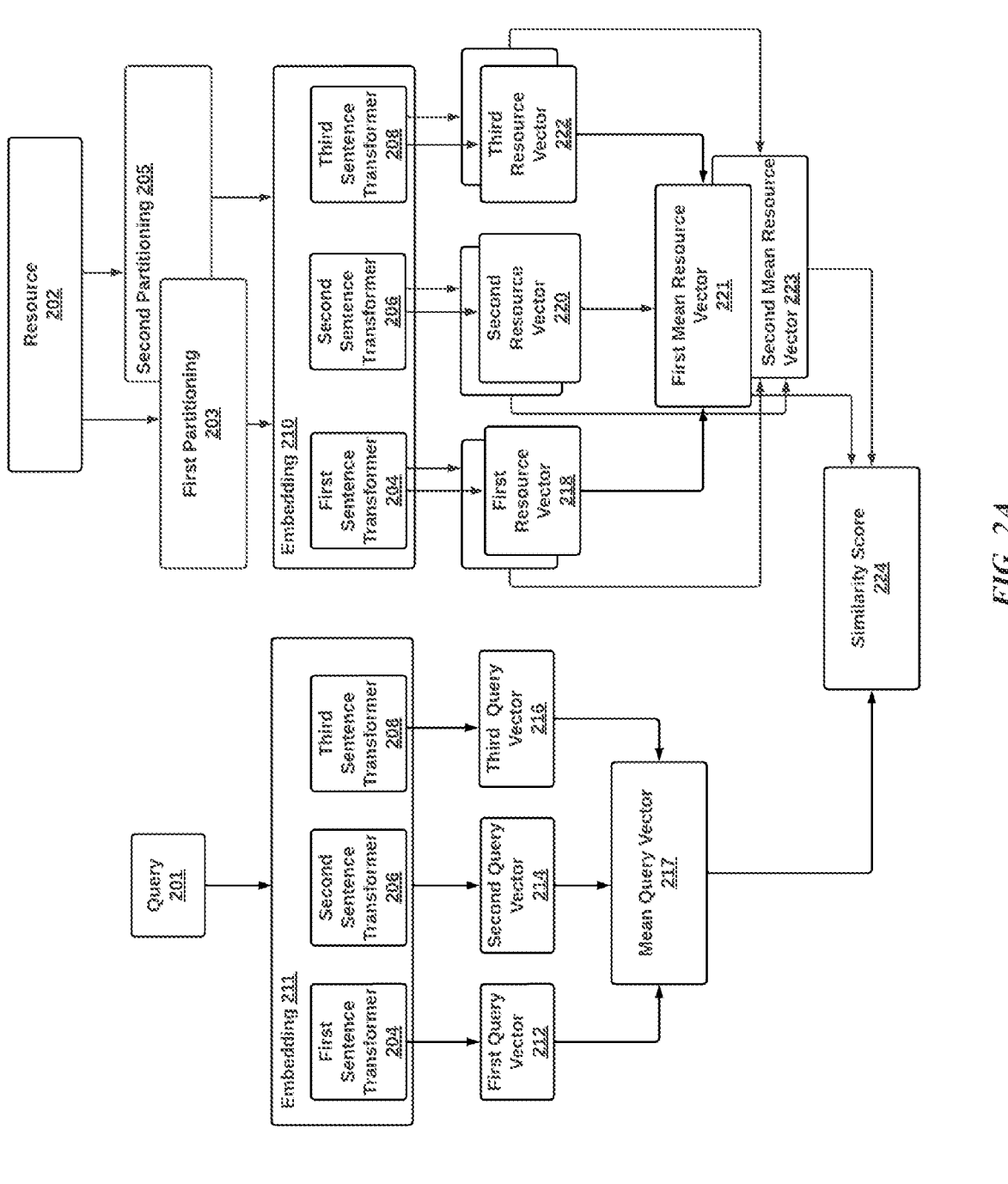
FIG. 2A shows another exemplary diagram of a search engine, according to one or more embodiments of the present subject matter.

FIG. 2A shows another exemplary diagram of a personalized embedding all-content search engine system 200 according to the present subject matter. A site or domain can include or be associated with resources 202 that could be provided as an answer to a user's question or query. According to some embodiments, an answer can comprise one or more specific paragraphs of a resource. The resources 202 can include all available content, for example, pre-written help articles, community posts, blogs, developer portal, and academy. Furthermore, each source can comprise one or more textual paragraphs or sections.

As shown in FIG. 2A, via embedding 210, the search engine system 200 can pre-calculate vectorized resources based on resources 202. According to some embodiments, a resource can be partitioned in a number of different ways, wherein each partitioning and the following embedding will yield a different resource vector. For example, a first partitioning 203 can embed an abstract of the help article instead of the whole article, and a second partitioning 205 can embed the first sentence of each paragraph in a help article. Furthermore, the partitioned resources from first partitioning 203 and second partitioning 205 can be individually provided to embedding 210 for the vectorization process.

According to some embodiments, embedding 210 can comprise a number of different sentence transformers, such as first sentence transformer 204, second sentence transformer 206 and third sentence transformer 208. Each sentence transformer can compress the partitioned textual data into vectors. Examples of such language transformers can be SBERT, Word2Vec, GLoVE, which can create sentence-level or paragraph-level vector embeddings.

According to some embodiments, first sentence transformer 204 can partition a resource in a different manner from second sentence transformer 206 or third sentence transformer 208. In such cases, first partitioning 203 or second partitioning 205 is inherently built within the sentence transformer functions.

Via first partitioning 203, first sentence transformer 204 can generate a first resource vector 218 for resource 202, second sentence transformer 206 can generate a second resource vector 220, and third sentence transformer 208 can generate a third resource vector 222.

According to some embodiments, the system can generate a first mean resource vector 221 for first partitioning 203 of resource 202, which can be based on averaging first resource vector 218, second resource vector 220 and third resource vector 222. Similarly, the system can generate a second mean resource vector 223 for second partitioning 205 of resource 202 based on the three sentence-level or paragraph-level vector embeddings.

In addition to averaging the resource vector embeddings, the system can implement other embedding operations such as subtraction and addition for optimized embeddings that can accurately represent resource 202. The resulting vector embeddings can be stored in a source vector database.

At search time, a user can provide a query 201 on a computing device associated with search engine system 200, and the system can vectorize the query via embedding 211. According to some embodiments, query 201 can be an explicit query from support tickets or chats. Furthermore, query 201 can be a textual query that can be directly provided to embedding 211 for vectorization. Query 201 can also be a question transcribed from voice inputs via a voice-enabled interface.

According to some embodiments, query 201 can be an implied query from the user's tracked actions on a site or domain. A number of tracking and analytics tools can be adopted. For example, a tracking application can record the user's click history by capturing elements that the user has clicked. In addition, an application can also record the user's scrolling history by tracking where the user has scrolled. Similarly, the application can capture the user's viewing section recordings.

Next, the system can generate descriptions based on the tracked user actions. For example, the descriptions can be "the user clicked a template email", "the user dragged the clicked template email to an email editor," and "the user spend over three minutes editing the template email." Furthermore, such descriptions can be used by the system to infer a textual query that is implied by these user actions. For example, an implied query base on the aforementioned descriptions can be "how to edit an email," or "how to save an email."

According to some embodiments, via the tracked user actions, the system can understand the content and context of the received query, either explicit or implied. According to some embodiments, the system can apply custom score adjustments to the similarity scores between the compared query and resources, wherein the custom score adjustments can be based on a number of user-specific factors.

Upon receiving query 201, the system can vectorize it via embedding 211 to generate vectorized query embeddings. According to some embodiments, embedding 211 can adopt a number of different sentence transformers such as first sentence transformer 204, a second sentence transformer 206 and a third sentence transformer 208. According to some embodiments, each of these sentence transformers can partition and vectorize query 201 in a different way. According to some embodiments, first sentence transformer 204 can generate a first query vector 212, second sentence transformer 206 can generate a second query vector 214, and a third sentence transformer 208 can generate a third query vector 216.

Furthermore, the system can generate a mean query vector 217 by averaging first query vector 212, second query vector 214 and third query vector 216. Next, to locate one or more answers for the query, the system can retrieve the stored mean resource vectors and compare them with the mean query vector 237 to find semantically similar content. For example, the system can generate similarity scores between the mean query vector 237 and each of the retrieved mean resource vectors. Accordingly, the system can select one or more probable answers or vectorized pairs with similarity scores higher than a threshold value. According to some embodiments, the threshold value can be empirically pre-determined or dynamically adapted. Furthermore, the system can sort and rank the selected vectorized resources in descending order to generate ordered resources, which can be displayed to the user as likely answers to query 201.

FIG. 2B shows yet another exemplary diagram of a personalized embedding all-content search engine system 250 according to the present subject matter. In this embodiment, the embedding 254 can comprise one sentence transformer 256. A site or domain can be associated with a number of resources 252, e.g., resource 1, resource 2 and resource 3. Resources 252 can comprise one or more textual paragraphs or sections. According to some embodiment, either the full content of resource 1 or some selected paragraphs can be provided to query 251 as an answer.

As shown in FIG. 2B, via embedding 254, the search engine system 250 can pre-calculate vectorized resources based on resources 252. For example, sentence transformer 256 can vectorize each resource via partitioning 253 and separately generate a number of source vectors 260, such as source vector 1, source vector 2 and source vector 3.

Later, following receiving a query 251 from a user, the system 250 can vectorize the query via embedding 254 to generate query vector 258. According to some embodiments, query 201 can be either an explicit query or an implied query inferred from the user's tracked actions or history.

Next, the system can retrieve the pre-calculated resource vectors 260 and compare them with the query vector 258 to find semantically similar content. For example, the system can generate a similarity score 262 between the query vector 258 and each of the retrieved resource vectors. Accordingly, the system can select one or more probable answers or vectorized pairs with similarity scores higher than a threshold value. Furthermore, the system can sort, rank and display the selected resources as probably answers in descending order.

Figure 3A:
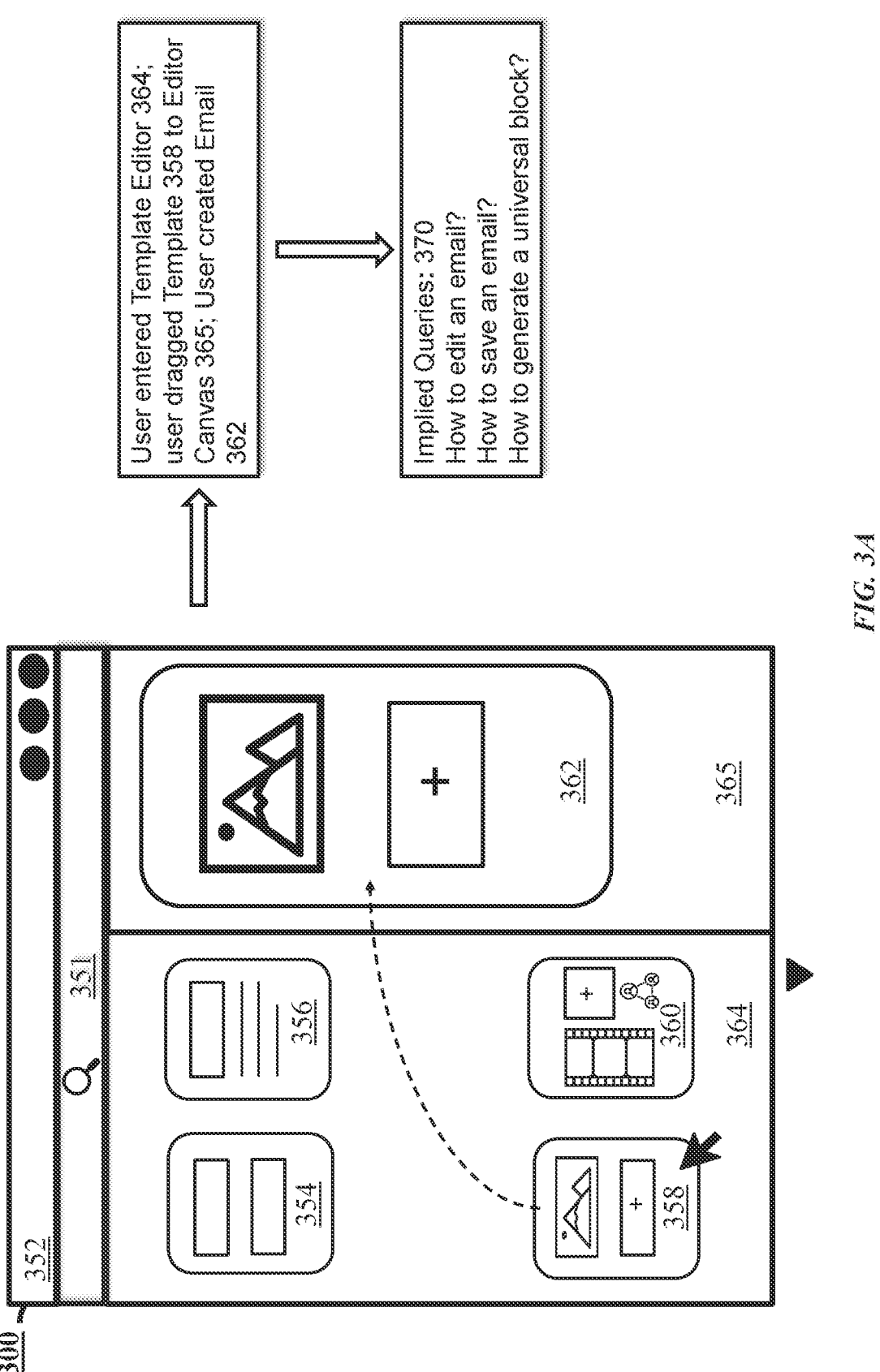
FIG. 3A shows an exemplary process for generating an implied query, according to one or more embodiments of the present subject matter.

FIG. 3A shows an exemplary process 300 for generating an implied query based on tracked user actions, according to one or more embodiments of the present subject matter. It shows an exemplary user interface 352 to create a base template email 362 using a template editor 364, according to some implementations of the present subject matter. As shown in this figure, an email service provider is configured to display template editor 364 on a display of a computing device.

According to some embodiments, template editor 364 can comprise one or more pre-generated base templates 354, 356, 358, and 360, which are configured to reduce time building a campaign or flow emails. Each of the base templates can feature different designs and themes, for example, to promote goods and services for different customer groups. By selecting a preferred base template 358, a user can "drag-and-drop" base template 358 to a blank editor canvas 365, which forms the basis of an email. Based on the selected base template, a user can, for example, further edit the content and layout of it to show relevant information for an email campaign.

In this example, the system can track a user's actions or input on user interface 352, transcribe these tracked actions into descriptions, and generate one or more implied queries 370. A number of tracking and analytics tools can be adopted by the system. For example, an application such as Google Analytics can record the user's click history by capturing elements that the user has clicked. In addition, an application can also record the user's scrolling history by tracking where the user has scrolled. Similarly, the tracking application can capture the user's viewing section recordings. For example, the tracking application can capture the use's continuous actions and transcribe them as "user entered template editor 364", "user dragged template 358 to editor canvas 365", and "user created email 362" and provide to the search engine system.

Furthermore, the tracking application can also detect the user's omission of actions for a predetermined amount of time, for example, 10 seconds. Upon such omission of action, the system can, via an implied query generator, infer that the user probably has questions regarding the next action. Here, the system can propose a number of potential implied queries 370, such as "How to edit an email?" "How to save an email?" and "How to generate a universal block?". These implied queries can be automatically displayed at query input 351 without the user typing in any questions. The order of these implied queries can be decided by a probability ranking based on multiple personal factors, such as the user's experience level with the domain. For example, when the user is new, "How to edit an email" can be ranked higher than a more advanced answer such as "How to generate a universal block". Furthermore, the user can confirm his/her interest in a query by clicking and selecting it. Such user feedback can be used to further reinforce the system's performance.

Figure 3B:
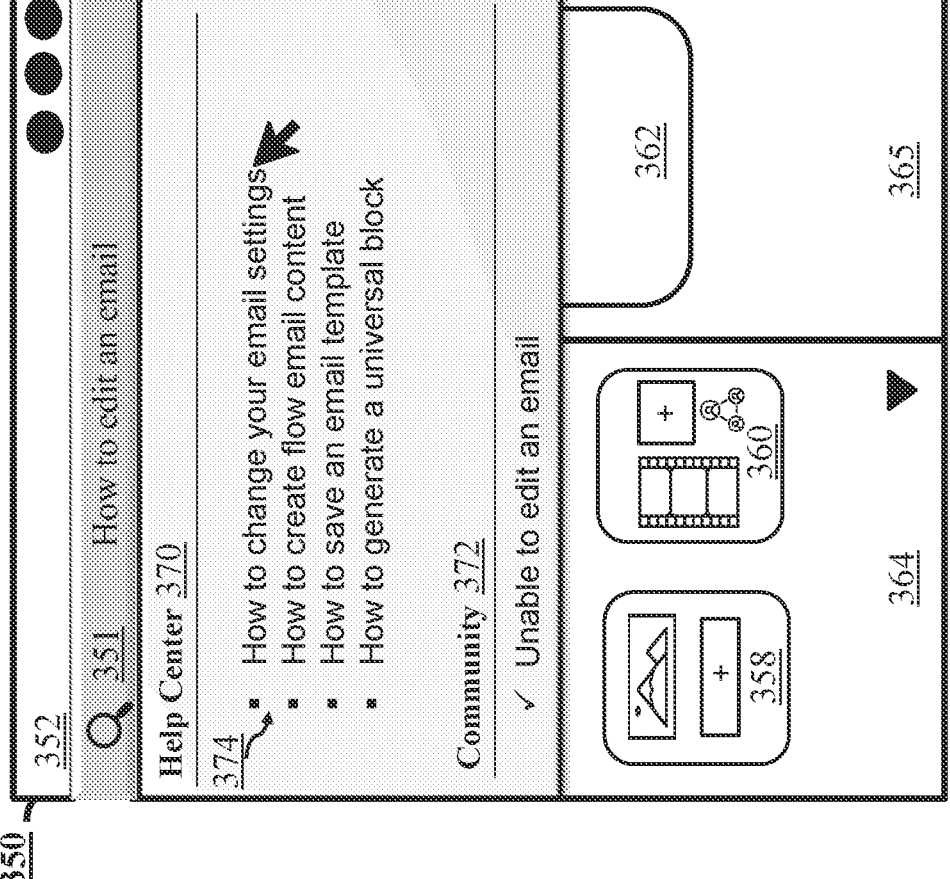
FIG. 3B shows an exemplary process for receiving and responding to a query, according to one or more embodiments of the present subject matter.

FIG. 3B shows an exemplary process 350 for receiving and responding to a query following FIG. 3A. As shown in this figure, the query input 351 can be "How to edit an email?". This query input 351 can be either an explicit query typed in by the user, or an implied query that has been confirmed by the user. Upon receiving the query, the personalized embeddings all-content search engine system can vectorize it via embedding to generate a vectorized query, e.g., sentence vector(s). To achieve that, the embedding process can utilize a number of different sentence transformers, each of which can partition a query in a different matter. According to some embodiments, for a same sentence transformer, the query can also be partitioned in a number of different ways, wherein each partitioning and embedding will yield a different query vector. According to some embodiments, a number of embedding operations can be used to generate a query vector based on the generated multiple query vectors.

To find semantically similar sentences in a resource as a response to the query, the system can locate paired embeddings that are numerically similar. The system can retrieve the pre-calculated and stored vectorized resources and compare them with the vectorized query. A number of similarity measures can be adopted by the system. For example, the system can determine the cosine similarity between the vectorized query and each vectorized resources.

As shown in FIG. 3B, the system can recommend and display a number of resources or articles from databases, e.g., help center 380, that are semantically similar to query input 351, i.e., "How to edit an email?". Other resources, such as forum discussions such as community 372, can also be provided. In addition, other resources can comprise all content related to the searched site or domain, such as academy content, and blog posts.

As disclosed herein, by comparing the similarity scores between the vectorized content in the vector space, the system can select a number of vectorized resources that are numerically similar and thus semantically similar. For example, the system can select vectorized pairs with similarity scores higher than a threshold value. According to some embodiments, the threshold value can be empirically predetermined. According to some embodiments, the threshold value can also be dynamically adapted based on the user's experience level and/or the domain's attributes.

Furthermore, the system can rank the selected resources in descending when being displayed as likely answers to the user's query. In this example, the displayed answers can be articles titled as "How to change your email settings", "How to create flow email content". Upon receiving a user's clicking and selecting of a title, the system can retrieve and display the full article. In addition, one or more specific paragraphs of an article closely related to the query can be displayed or highlighted as the answer(s).

According to some embodiments, to select the most likely answer(s), the system can apply one or more custom score adjustments to the similarity scores. For example, the customer score adjustments can be based on a number of user-specific factors, such as the user's experience level, the user's real-time position on the website, or the user's previous question record. According to some embodiments, the system can apply a numeric scalar to the similarity scores, for example, if the user's experience level is low, then increase the similarity scores for resources in the "Getting Started" section; if the user's experience level is high, then reduce the similarity scores for resources in such sections but increase the scores in advanced content.

According to some embodiments, the custom score adjustments can be based on a number of attributes of the query and/or the resources. Such attributes can enhance the understanding of the content and context of the query and can be generated via various mechanisms such as tracked user activities or locations. According to some embodiments, one attribute can describe the user's tracked location when he/she submits the supporting ticket or where the implied query is inferred from. For example, the system can increase the similarity scores for resources in the "flow" section when the user is creating a flow in an email campaign.

In another example, one attribute can be the keyword(s) in the content. When there are identical keywords or synonyms of a keyword, the system can increase the similarity scores between these vectorized texts.

In yet another example, one attribute can be the textual length of the query. For example, when a query is very short, e.g., less than 10 characters, the system can increase the similarity scores for resources in the "Getting Started" section. According to some embodiments, the system can apply custom score adjustments based on weighted considerations of user-specific factors and various attributes.

According to some embodiments, after displaying the probable answers and receiving the user's input, the system can apply model reinforcement by learning from user responses. For example, a successfully closed supporting ticket can confirm the accuracy of a probable answer, thus increasing the likelihood of success for the same answer in response to a similar question. In addition, model reinforcement can be applied to other stages, such as similarity scores or vectorized resources.

FIG. 4 shows some exemplary processes 400 for answering a query, according to one or more embodiments of the present subject matter. At step 402, the personalized embedding all-content search engine system can pre-calculate, by each of a plurality of sentence transformers, a plurality of resource vectors related to a list of resources. According to some embodiments, the system can partition each resource in the list of resources in a number of manners by the plurality of sentence transformers, wherein each resource is embedded differently in the pre-calculating. Furthermore, the system can save the plurality of resource vectors in a source vector database.

At step 404, the system can receive, by a server, a textual query from a user at search time. According to some embodiments, the textual query can be either an explicit textual query or an implied textual query. To generate the implied query, the system can track user actions, generate descriptions of one or more user actions, and determine the textual query based on the one or more descriptions by an implied query generator.

At step 406, the system can iteratively embed, by each of the sentence transformers, a number of query vectors based on the textual query. At step 408, the system can generate similarity scores between the vectorized textual query. The system can applying one or more custom score adjustments to the similarity scores. According to some embodiments, the custom score adjustments can be at least based on one or more user-specific factors such as the user's experience level. Furthermore, the custom score adjustment can be at least based on one or more attributes of the textual query and the list of resources.

According to some embodiments, the system can generate a mean query vector of the textual query based on the plurality of query vectors, and generate a mean resource vector of the list of resources based on the plurality of resource vectors, wherein the similarity scores are based on the mean query vector of the textual query and the mean resource vector of the list of resources.

At step 410, the system can determine, from the list of resources, one or more probable answers to the textual query based on the similarity scores. According to some embodiments, the system can rank the one or more probable answers to the textual query based on the similarity scores in descending order. Furthermore, the system can identified portions of the list of resources as the probable answers.

Figure 5:
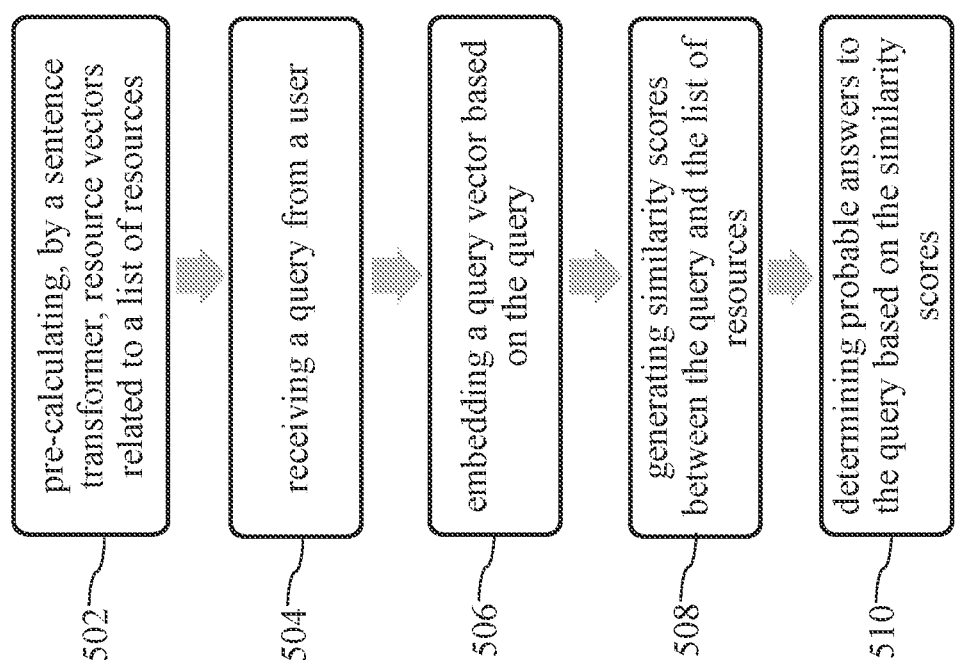
FIG. 5 shows some exemplary processes for answering a query, according to one or more embodiments of the present subject matter.

FIG. 5 shows some exemplary processes 500 for answering a query, according to one or more embodiments of the present subject matter. At step 502, the personalized embedding all-content search engine system can pre-calculating, by a sentence transformer, a plurality of resource vectors related to a list of resources. At step 504, the system can receive a query from a user at search time. At step 506, the system can embed, by the sentence transformer, a query vector based on the query. At step 508, the system can generate similarity scores between the vectorized query and the list of resources. At step 510, the system can determine, from the list of resources, one or more probable answers to the query based on the similarity scores.

FIG. 6 shows some exemplary processes 600 for answering a query, according to one or more embodiments of the present subject matter. At step 602, the personalized embedding all-content search engine system can pre-calculate, by each of a plurality of sentence transformers, a plurality of resource vectors related to a list of resources. At step 604, the system can track one or more user actions on the website. At step 606, the system can generate descriptions of the one or more user actions. At step 608, the system can determine an implied textual query based on the one or more descriptions. At step 610, the system can iteratively embed, by each of the plurality of sentence transformers, a plurality of query vectors based on the textual query. At step 612, the system can generate similarity scores between the vectorized textual query and the list of resources. At step 614, the system can determine, from the list of resources, one or more probable answers to the textual query based on the similarity scores.

Figure 7A:
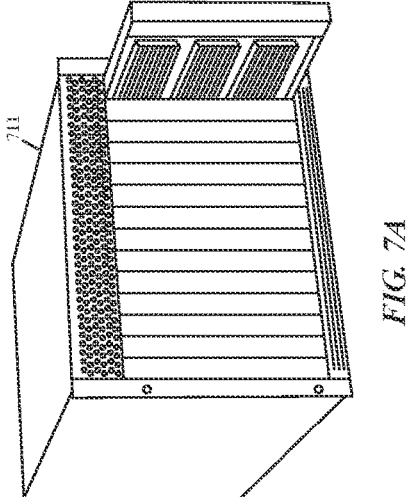
FIG. 7A shows a server system of rack-mounted blades, according to one or more embodiments of the present subject matter.

FIG. 7A shows a server system of rack-mounted blades for implementing the present subject matter. Various examples are implemented with cloud servers, such as ones implemented by data centers with rack-mounted server blades. FIG. 7A shows a rack-mounted server blade multi-processor server system 711. Server system 711 comprises a multiplicity of network-connected computer processors that run software in parallel.

Figure 7B:
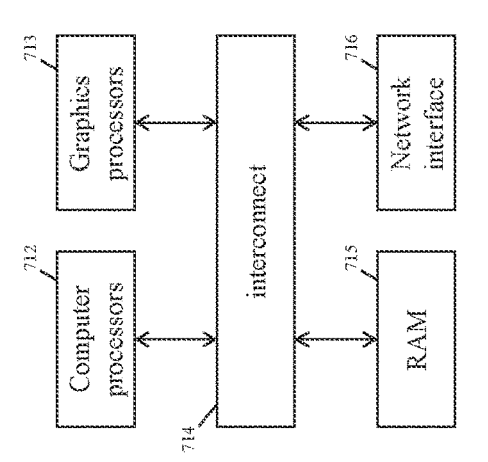
FIG. 7B shows a diagram of a networked data center server, according to one or more embodiments of the present subject matter.

FIG. 7B shows a diagram of a server system 711. It comprises a multicore cluster of computer processors (CPU) 712 and a multicore cluster of graphics processors (GPU) 713. The processors connect through a board-level interconnect 714 to random-access memory (RAM) devices 715 for program code and data storage. Server system 711 also comprises a network interface 716 to allow the processors to access the Internet, non-volatile storage, and input/output interfaces. By executing instructions stored in RAM devices 715, the CPUs 712 and GPUs 713 perform steps of methods described herein.

Figures 8A, 8B:
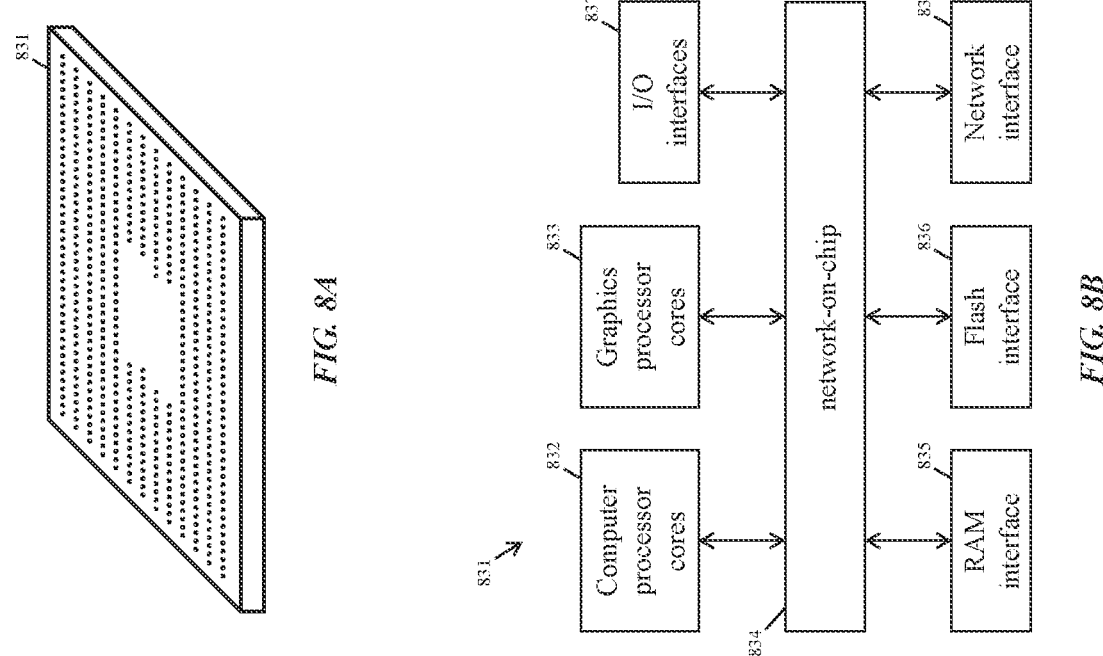
FIG. 8A shows a packaged system-on-chip device, according to one or more embodiments of the present subject matter.
FIG. 8B shows a block diagram of a system-on-chip, according to one or more embodiments of the present subject matter.

FIG. 8A shows the bottom side of a packaged system-on-chip device 831 with a ball grid array for surface-mount soldering to a printed circuit board. Various package shapes and sizes are possible for various chip implementations. System-on-chip (SoC) devices control many embedded systems, IoT device, mobile, portable, and wireless implementations.

FIG. 8B shows a block diagram of the system-on-chip 831. It comprises a multicore cluster of computer processor (CPU) cores 832 and a multicore cluster of graphics processor (GPU) cores 833. The processors connect through a network-on-chip 834 to an off-chip dynamic random access memory (DRAM) interface 835 for volatile program and data storage and a Flash interface 836 for non-volatile storage of computer program code in a Flash RAM non-transitory computer readable medium. SoC 831 also has a display interface for displaying a graphical user interface (GUI) and an I/O interface module 837 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 831 also comprises a network interface 838 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 835 or Flash devices through interface 836, the CPU cores 832 and GPU cores 833 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Several aspects of implementations and their applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method for answering a query, the method comprising:

partitioning, by a plurality of sentence transformers, each resource in a list of resources into a plurality of resource portions;

pre-calculating, by the plurality of sentence transformers, a plurality of resource vectors, wherein the pre-calculating of the plurality of resource vectors comprises:

vectorizing all text of whole resources in the list of resources into a first set of resource vectors of the plurality of resource vectors; and vectorizing text of at least some resource portions of the plurality of resource portions that have been partitioned into a second set of resource vectors of the plurality of resource vectors;

receiving, by a server, a textual query from a user at search time;

partitioning, by the plurality of sentence transformers, the textual query into a plurality of query portions;

iteratively embedding, by the plurality of sentence transformers, a plurality of query vectors based on the plurality of query portions;

generating, by the server, similarity scores between the plurality of query vectors and the plurality of resource vectors;

tracking, by the server, user behavior associated with the user and a location of the user when submitting the textual query, wherein the tracking of the user behavior occurs at search time;

adjusting, by the server, at least some of the similarity scores based on feedback from the user, one or more attributes of the textual query, and the list of resources, wherein the feedback from the user comprises the user behavior at search time, wherein the adjusting of the similarity scores at search time further comprises limiting comparison of the plurality of query vectors to a subset of the plurality of resource vectors selected based on the adjusted similarity scores;

selecting, by the server, one or more vectorized pairs of query vector and resource vectors from the subset of the plurality of resource vectors based on the similarity scores;

determining, by the server, one or more probable answers to the textual query based on the one or more vectorized pairs that were selected;

displaying the one or more probable answers; and applying model reinforcement to the similarity scores and the resource vectors based on the feedback from the user, wherein the similarity scores or resource vectors stored by the server are modified and used in subsequent executions of the method.

2. The computer-implemented method of claim 1, further comprising:

partitioning each resource in the list of resources in a number of manners by the plurality of sentence transformers, wherein each resource is embedded differently in the pre-calculating.

3. The computer-implemented method of claim 1, further comprising:

increasing at least some of the similarity scores between a same or similar query and a confirmed answer, wherein the textual query is a query from a support ticket, wherein the confirmed answer is based on a successful closing of the support ticket, and wherein the closing of the support ticket confirms accuracy of a probable answer.

4. The computer-implemented method of claim 1, further comprising:

tracking one or more user actions;

generating descriptions of the one or more user actions; and determining the textual query based on the one or more descriptions, wherein the textual query is an implied textual query.

5. The computer-implemented method of claim 1, wherein the adjusting of the similarity scores is based at least in part on one or more user-specific factors.

6. The computer-implemented method of claim 5, wherein one of the one or more user-specific factors comprises user's experience level.

7. The computer-implemented method of claim 6, further comprising:

applying a numerical scalar to the similarity scores based on the user's experience level.

8. The computer-implemented method of claim 1, further comprising:

generating a mean query vector of the textual query based on the plurality of query vectors; and generating a mean resource vector of the list of resources based on the plurality of resource vectors, wherein the similarity scores are based on the mean query vector of the textual query and the mean resource vector of the list of resources.

9. The computer-implemented method of claim 1, further comprising:

determining the one or more probable answers to the textual query having similarity scores higher than a predetermined threshold.

10. The computer-implemented method of claim 9, further comprising:

ranking the one or more probable answers to the textual query based on the similarity scores in descending order.

11. The computer-implemented method of claim 1, wherein the one or more probable answers comprises identified portions of the list of resources.

12. The method of claim 1, wherein the subset of the plurality of resource vectors comprises one or more mean resource vectors generated from a plurality of resource vectors.

13. A system for answering a query, the system comprising:

one or more processors; and logic encoded in one or more non-transitory computer-readable storage media for execution by the one or more processors and when executed operable to cause the one or more processors to perform operations comprising:

partitioning, by a plurality of sentence transformers, each resource in a list of resources into a plurality of resource portions;

pre-calculating, by the plurality of sentence transformers, a plurality of resource vectors, wherein the pre-calculating of the plurality of resource vectors comprises:

vectorizing all text of whole resources in the list of resources into a first set of resource vectors of the plurality of resource vectors; and vectorizing text of at least some resource portions of the plurality of resource portions that have been partitioned into a second set of resource vectors of the plurality of resource vectors;

receiving, by a server, a textual query from a user at search time;

partitioning, by the plurality of sentence transformers, the textual query into a plurality of query portions;

iteratively embedding, by the plurality of sentence transformers, a plurality of query vectors based on the plurality of query portions;

generating, by the server, similarity scores between the plurality of query vectors and the plurality of resource vectors;

tracking, by the server, user behavior associated with the user and a location of the user when submitting the textual query, wherein the tracking of the user behavior occurs at search time;

adjusting, by the server, at least some of the similarity scores based on feedback from the user, one or more attributes of the textual query, and the list of resources, wherein the feedback from the user comprises the user behavior at search time, wherein the adjusting of the similarity scores at search time further comprises limiting comparison of the plurality of query vectors to a subset of the plurality of resource vectors selected based on the adjusted similarity scores;

selecting, by the server, one or more vectorized pairs of query vector and resource vectors from the subset of the plurality of resource vectors based on the similarity scores;

determining, by the server, one or more probable answers to the textual query based on the one or more vectorized pairs that were selected;

displaying the one or more probable answers; and applying model reinforcement to the similarity scores and the resource vectors based on the feedback from the user, wherein the similarity scores or the resource vectors stored by the system are modified and used in subsequent query processing operations.

14. The system of claim 13, wherein the textual query comprises a textual query entered by the user.

15. The system of claim 13, wherein the logic when executed is further operable to cause the one or more processors to perform operations comprising:

tracking one or more user actions;

generating descriptions of the one or more user actions; and determining the textual query based on the one or more descriptions, wherein the textual query is an implied textual query.

16. The system of claim 13, wherein the logic when executed is further operable to cause the one or more processors to perform operations comprising:

partitioning each resource in the list of resources in a number of manners by the plurality of sentence transformers, wherein each resource is embedded differently in the pre-calculating.

17. The system of claim 13, wherein the subset of the plurality of resource vectors comprises one or more mean resource vectors generated from a plurality of resource vectors.

18. A computer-implemented method for finding content related to a query, the method comprising:

partitioning, by a plurality of sentence transformers, each resource in a list of resources into a plurality of resource portions;

pre-calculating, by the plurality of sentence transformers, a plurality of resource vectors, wherein the pre-calculating of the plurality of resource vectors comprises:

vectorizing all text of whole resources in the list of resources into a first set of resource vectors of the plurality of resource vectors; and vectorizing text of at least some resource portions of the plurality of resource portions that have been partitioned into a second set of resource vectors of the plurality of resource vectors;

receiving, by a server, a textual query from a user at search time;

partitioning, by the plurality of sentence transformers, the textual query into a plurality of query portions;

iteratively embedding, by the plurality of sentence transformers, a plurality of query vectors based on the plurality of query portions;

generating, by the server, similarity scores between the plurality of query vectors and the plurality of resource vectors;

tracking, by the server, user behavior associated with the user and a location of the user when submitting the textual query, wherein the tracking of the user behavior occurs at search time;

adjusting, by the server, at least some of the similarity scores based on feedback from the user, one or more attributes of the textual query, and the list of resources, wherein the feedback from the user comprises the user behavior at search time, wherein the adjusting of the similarity scores at search time further comprises limiting comparison of the plurality of query vectors to a subset of the plurality of resource vectors selected based on the adjusted similarity scores;

selecting, by the server, one or more vectorized pairs of query vector and resource vectors from the subset of the plurality of resource vectors based on the similarity scores;

determining, by the server, one or more probable answers to the textual query based on the one or more vectorized pairs that were selected;

displaying the one or more probable answers; and applying model reinforcement to the similarity scores and the resource vectors based on the feedback from the user, wherein the similarity scores or resource vectors stored by the server are modified and used in subsequent executions of the method.

19. The method of claim 18, wherein the subset of the plurality of resource vectors comprises one or more mean resource vectors generated from a plurality of resource vectors.

\* \* \* \* \*